(12) United States Patent
Ogura

(10) Patent No.: US 8,549,957 B2
(45) Date of Patent: Oct. 8, 2013

(54) ROTATION ANGLE DETECTING APPARATUS

(75) Inventor: Takahiro Ogura, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 355 days.

(21) Appl. No.: 12/923,347

(22) Filed: Sep. 15, 2010

(65) Prior Publication Data

US 2011/0066356 A1 Mar. 17, 2011

(30) Foreign Application Priority Data

Sep. 16, 2009 (JP) .................................. 2009-214730

(51) Int. Cl.
*G05G 1/30* (2008.04)
*G05G 1/04* (2006.01)
*G01V 3/00* (2006.01)

(52) U.S. Cl.
USPC .................... 74/513; 74/512; 74/514; 74/516; 324/207.25

(58) Field of Classification Search
USPC ...................... 349/86; 74/512, 513, 514, 516; 324/307.25
See application file for complete search history.

(56) References Cited

U.S. PATENT DOCUMENTS

| 5,096,282 | A * | 3/1992 | Margerum et al. ................ 359/3 |
| 6,689,016 | B2 * | 2/2004 | Apel .............................. 477/115 |
| 7,066,049 | B2 * | 6/2006 | Reimann et al. ................. 74/513 |
| 7,212,914 | B2 * | 5/2007 | Wilczek et ..................... 701/115 |
| 2011/0018529 | A1 * | 1/2011 | Soyama et al. ........... 324/207.25 |

FOREIGN PATENT DOCUMENTS

| JP | 5-11753 | 2/1993 |
| JP | 2008-201312 | 9/2008 |

* cited by examiner

*Primary Examiner* — Thomas R Hannon
*Assistant Examiner* — Kashif Mohammed

(57) ABSTRACT

A rotation angle detecting apparatus to detect a rotation angle of a rotating member, including a housing, the rotating member being disposed so as to be rotatable relative to the housing; a fixing member to fix a magnet to the rotating member; and a sensor, fixed to the housing, to detect a rotation angle of the magnet, the rotating member including an abutting part with which the magnet abuts in a direction of a rotation axis of the rotating member, and a supporting part that faces the abutting part with the magnet interposed therebetween to support the fixing member located between the magnet and the supporting part, and the fixing member presses the magnet against the abutting part by coming into contact with the supporting part and the magnet without allowing a section contacting the supporting part and a section contacting the magnet to overlap with each other.

10 Claims, 5 Drawing Sheets

ROTATION ANGLE DETECTING APPARATUS

CROSS-REFERENCE TO RELATED APPLICATIONS

This application claims the priority benefit of Japanese Patent Application No. 2009-214730, filed on Sep. 16, 2009 in the Japanese Patent Office, the disclosure of which is incorporated herein by reference.

BACKGROUND

1. Field

Embodiments relate to a rotation angle detecting apparatus to detect a rotation angle of a rotating member, and more particularly relate to a rotation angle detecting apparatus that is susceptible to external shock, such as an accelerator pedal device, which controls the amount of intake air into an engine on the basis of a depression angle.

2. Description of the Related Art

A conventional rotation angle detecting apparatus for detecting a rotation angle of an accelerator pedal, for example, is mounted with a magnet to generate a magnetic field on the accelerator pedal side, and a sensor to detect a behavior of the magnetic field on the side where a housing, for example, is fixed. The magnet is press-fitted and fixed to a circumference with a rotation axis of the accelerator pedal as its center. The sensor converts the density of a magnetic flux, the angle of which changes as the magnet rotates when the accelerator pedal is stepped on, to an electrical signal and outputs this electrical signal. The amount of intake air into the engine is controlled by inputting this output electrical signal to a controller that controls the opening of a throttle valve that adjusts the amount of intake air into the engine. Incidentally, when the magnet is not completely fixed to the accelerator pedal, it is difficult for the sensor to accurately detect the depression angle of the accelerator pedal, which degrades the accuracy of controlling the amount of intake air.

There is known a resin accelerator pedal device that uses heat-softened resin to caulk-fix a magnet that is press-fitted to an accelerator pedal, thereby preventing the magnet from falling off the accelerator pedal such as disclosed in, for example, Japanese Unexamined Patent Application Publication No. 2008-201312.

There is also known a compact motor in which a magnet inserted into a frame is fixed to the frame by being pressed against the frame using a ring-shaped plate spring embedded in an inner peripheral wall of the frame such as disclosed in, for example, Japanese Unexamined Utility Model Application Publication No. H5-11753.

In the rotation angle detecting apparatus for an accelerator pedal device that is described in Japanese Unexamined Patent Application Publication No. 2008-201312, when caulk-fixing the magnet by using the softened resin, the heat added at this time contracts/deforms the resin around the magnet. As a result, a small gap is generated around the magnet, causing misalignment and loosening. Moreover, when adhering the softened resin to the magnet, strong pressure and high heat are transmitted to the magnet, resulting in the risk of deteriorating the holding force and durability of the magnet. In addition, great number of management tasks are required such as examining the cross section of the resin that is deformed by caulking, as well as checking the holding force of the magnet, and the temperature, pressure and the time of application thereof need to be adjusted according to the type of the resin.

In the rotation angle detecting apparatus for a compact motor that is described in Japanese Unexamined Utility Model Application Publication No. H5-11753, the plate spring for fixing the magnet is supported at the section where the plate spring is embedded in the frame serving as a chassis. For this reason, the magnet might be removed relatively easily by external shock, deterioration of the section where the plate spring is embedded, and contraction due to the changes in the temperature. Furthermore, because the spring needs to be compressed when being attached to the frame, the accuracy of attaching the spring becomes unstable, making it difficult to fix the magnet stably.

SUMMARY

Therefore, it is one aspect to provide a rotation angle detecting apparatus that is susceptible to strong external shock such as an accelerator pedal device in particular, wherein a magnet for generating a detected magnetic field is steadily fixed with fewer processes and prevented from falling off.

Additional aspects will be set forth in part in the description which follows and, in part, will be apparent from the description, or may be learned by practice of the invention.

In accordance with one aspect, a rotation angle detecting apparatus to detect a rotation angle of a rotating member includes a rotating member that is disposed so as to be rotatable relative to a housing; a fixing member to fix a magnet to the rotating member; and a sensor, fixed to the housing, to detect a rotation angle of the magnet, wherein the rotating member has an abutting part with which the magnet abuts in a direction of a rotation axis of the rotating member, and a supporting part that faces the abutting part with the magnet interposed therebetween to support the fixing member located between the magnet and the supporting part, and wherein the fixing member presses the magnet against the abutting part by coming into contact with the supporting part and the magnet without allowing a section contacting the supporting part and a section contacting the magnet to overlap with each other in the direction of the rotation axis.

The fixing member may press the magnet against the abutting part by being rotated in one direction around an axis that is parallel to the rotation axis in a space sandwiched between a plain surface including the abutting part and a plain surface including the supporting part.

The supporting part may have an inclined supporting part which is a part of the supporting part inclined to the rest thereof, and a force to press the magnet against the abutting part increases as the fixing member rotates in the one direction along the inclined supporting part.

The rotating member may have a rotation preventing part that prevents the fixing member from rotating only in a direction opposite to the one direction.

The rotation preventing part may be provided on the supporting part.

The rotating member may be configured by a member including an accelerator pedal that controls an amount of intake air into an engine based on a depression angle, and the rotation preventing part may prevent the fixing member from rotating only in a direction in which the accelerator pedal is stepped on.

In the rotation angle detecting apparatus, the fixing member may act in such a way as to exert a biasing force only by being held between the magnet and the supporting part. Therefore, the fixed member can be supported steadily without mounting a compressed spring. This allows the magnet to be fixed firmly, preventing the magnet from loosening, being misaligned, and falling off. In addition, since the magnet can be prevented from being subjected to high temperature or pressure due to heat caulking or molding, the holding force and durability of the magnet are not deteriorated.

The fixing member may act in such a way as to bias the magnet and press it against the abutting part by rotating between the magnet and the supporting part, thereby it is no longer necessary to employ a high-intensity method of embedding the supporting side in a chassis, and the durability of the structure for fixing the magnet increases. Furthermore, because the fixed magnet can be released only by rotating the fixing member in the opposite direction, the fixing member can be replaced easily without requiring any irreversible steps in attaching/detaching the fixing member.

Moreover, since a part of the supporting member to support the fixing member may constitute the inclined supporting part with an inclination, the force to bias the magnet increases as the fixing member slides and rotates along the inclined surface. As a result, the magnet can be fixed tightly only by rotating the fixing member.

In addition, the rotation preventing part can prevent the fixing member from rotating in a direction opposite to the rotation direction in which the magnet is biased. Thus, the fixing member is prevented from loosening, and can constantly and steadily bias the magnet.

Particularly, the rotation preventing part can be provided on the supporting part and can therefore be configured integrally with the supporting part, thereby enabling a lean structure to be obtained.

The rotation preventing part to prevent the relative rotation of the fixing member relative to the rotating member may prevent the fixing member from rotating only in a direction in which the accelerator pedal is stepped on. Therefore, the rotation is allowed only in a direction in which the fixing member rotates relative to the rotating member by the shock received when the accelerator pedal returns to a rest position thereof. Thus, even in the rotation angle detecting apparatus that is subjected to strong external shock such as the accelerator pedal, the magnet can be continuously fixed steadily.

As described above, the magnet can be stably and steadily fixed, by employing a configuration in which the fixing member can be steadily supported and easily attached.

BRIEF DESCRIPTION OF THE DRAWINGS

These and/or other aspects will become apparent and more readily appreciated from the following description of embodiments, taken in conjunction with the accompanying drawings of which.

DESCRIPTION OF EMBODIMENTS

Figure 1:
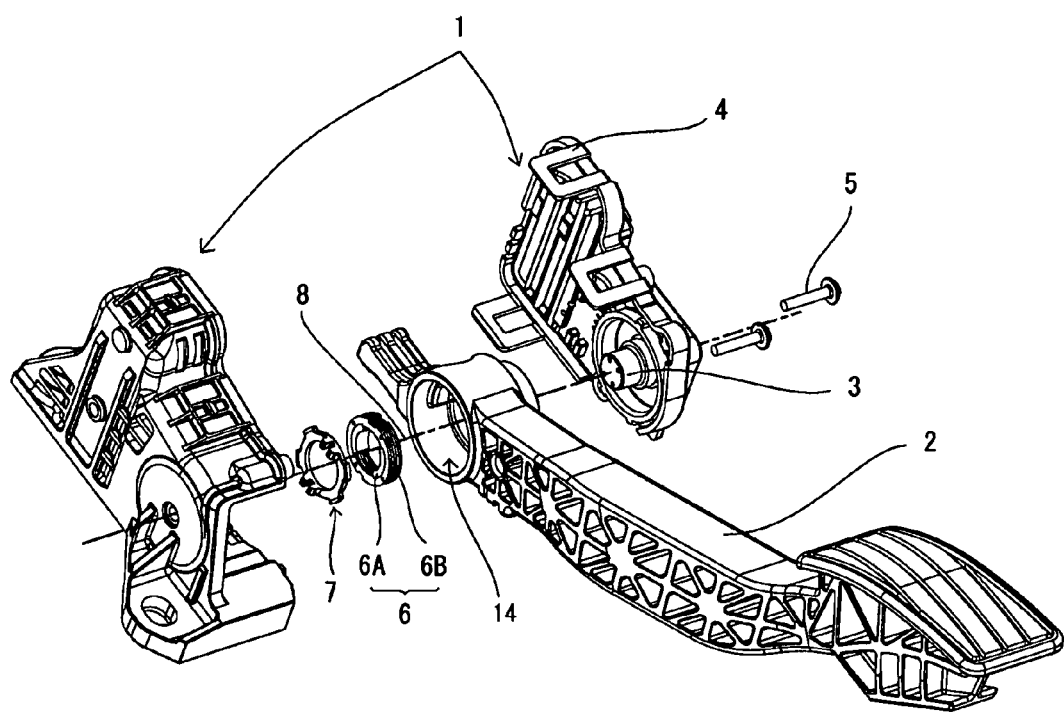
FIG. 1 is an entire configuration diagram showing a rotation angle detecting apparatus according to a first embodiment.
Figure 2:
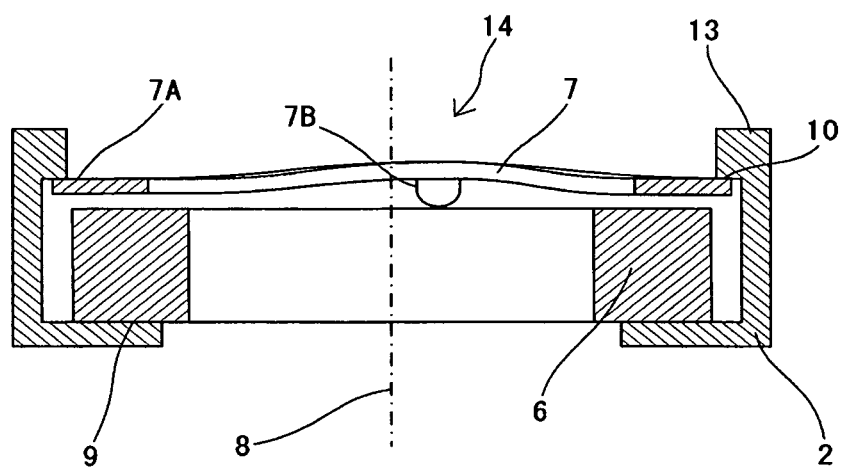
FIG. 2 is a cross-sectional diagram in which substantial parts illustrate how a fixing member fixes a magnet in the rotation angle detecting apparatus according to the first embodiment.
Figure 3:
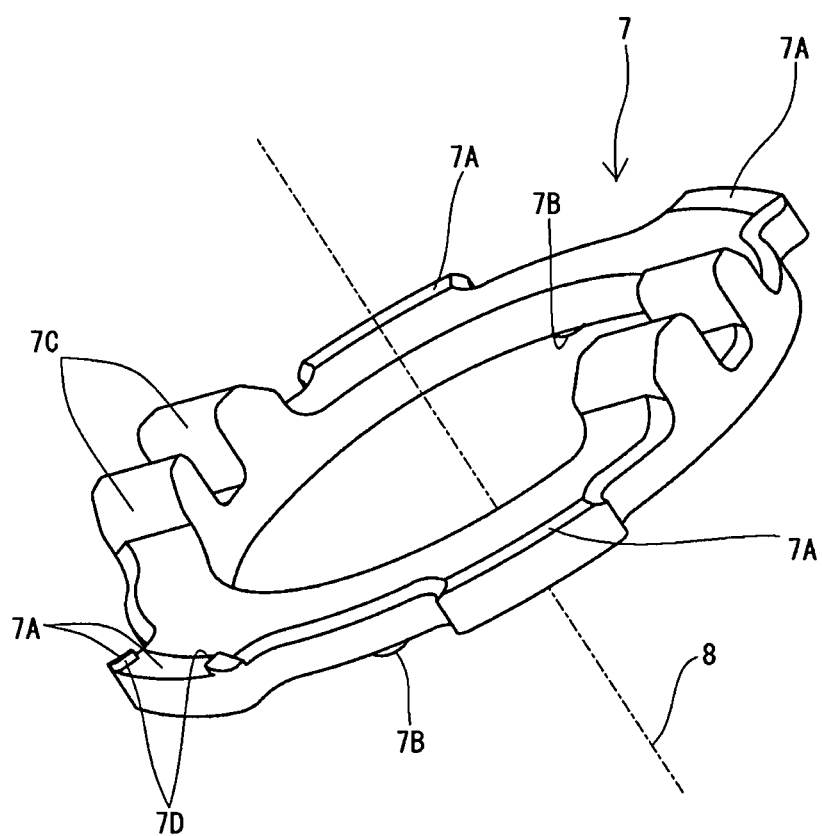
FIG. 3 is a structure diagram of the fixing member of the rotation angle detecting apparatus according to the first embodiment.
Figures 4A, 4B:
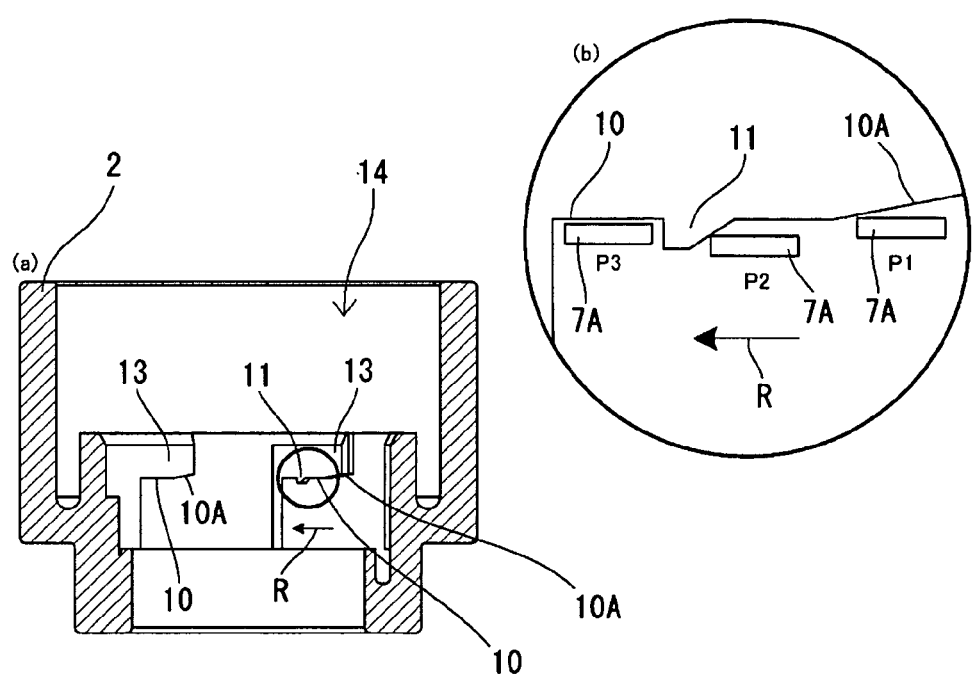
FIG. 4A is a cross-sectional diagram that is illustrated by cutting a rotating member of the rotation angle detecting apparatus according to the first embodiment along a plain surface passing through a rotation axis 8, so that a supporting part 10 and rotation preventing part 11 are exposed.
FIG. 4B is an enlarged diagram of an area circled in FIG. 4A, showing how a fixing member 7 slides along the supporting part 10.

Reference will now be made in detail to embodiments, examples of which are illustrated in the accompanying drawings, wherein like reference numerals refer to like elements throughout.

First, the entire configuration of a rotation angle detecting apparatus according to a first embodiment is described with reference to FIG. 1. Here is described an example in which the rotation angle detecting apparatus of the present embodiment is applied to an accelerator pedal device.

An accelerator pedal device shown in FIG. 1 is mounted in a vehicle and controls the operating condition of an engine of the vehicle in response to the pedaling amount of an accelerator pedal 2 obtained by a driver. In the accelerator pedal device of the present embodiment, a by-wire system is adopted, wherein the rotation angle of the accelerator pedal 2 is converted into an electrical signal by a sensor 3, which is then transmitted as a rotation angle signal to a controller called ECU. Based on this signal and other vehicle information, the ECU controls a throttle device that adjusts the amount of intake air into the engine.

The accelerator pedal 2 is disposed as a rotating member 2, so as to be rotatable around a rotation axis 8 in relation to a housing 1. A return spring, not shown, biases the accelerator pedal 2 in a direction opposite to the direction in which the driver steps on the accelerator pedal 2, whereby the side opposite to the stepped part with the rotation axis 8 therebetween is pressed against the housing 1. With this condition as a rest position of the accelerator pedal 2, an initial value of the rotation angle of the accelerator pedal 2 is set. The sensor 3 for detecting the rotation of the accelerator pedal 2 functioning as the rotating member 2 is installed in the housing 1. The housing 1 is joined by snap-fit parts 4 and screws 5, whereby the accelerator pedal 2 functioning as the rotating member 2 and the sensor 3 are disposed in predetermined relative positions. A magnet 6 is disposed on the circumference of the rotating member 2 with the rotation axis 8 as its center. The magnet 6 is configured by a magnet core 6A and annular armatures 6B, which form a pair of arc-shaped permanent magnets. The magnet 6 is fixed to the rotating member 2 by a fixing member 7. A magnetic flux generated by the magnet 6 is detected by the sensor 3, whereby the rotation angle of the accelerator pedal 2 is converted into an electrical signal. A hole type sensor for detecting a behavior of a magnetic flux based on the movement of a hole carrier, or a noncontact sensor of magnetoresistance type for detecting a behavior of a magnetic flux based on angular variation of a magnetoresistance is employed as the sensor 3.

A condition in which the magnet 6 of the first embodiment is fixed to the rotating member 2 is described with reference to FIGS. 2, 3, 4A and 4B.

The rotating member 2 has an internal space 14 in which the magnet 6, the fixing member 7, the sensor 3 and the like can be disposed. Here, the fixing member 7 is formed into a thin disk shape and has a supporting part side acting part 7A bulging out radially and a magnet side acting part 7B bulging out axially. A circumferential convex part 13 that partially inhibits the insertion of the fixing member 2 is formed in a wall of the rotating member that surrounds the internal space 14, and a supporting part 10 is formed on a surface of the circumferential convex part 13 that faces the magnet 6. The supporting part side acting part 7A and the magnet side acting part 7B are configured so as not to overlap with each other when viewed from the direction of the rotation axis 8. Specifically, four of the supporting part side acting parts 7A and four of the magnet side acting parts 7B are disposed alternately in a circumferential direction. When the fixing member 7 is disposed in the internal space 14, each supporting part side acting part 7A abuts with the supporting part 10 and each magnet side acting part 7B abuts with the magnet 6. The supporting part side acting part 7A of the fixing member 7 is supported by the supporting part 10 and the magnet side acting part 7B comes into contact with the magnet 6, whereby the fixing member 7 presses the magnet 6 against an abutting part 9. The biasing force required in this pressing motion is generated when the fixing member 7 deflects with the supporting part side acting part 7A and the magnet side acting part 7B as fulcrums.

The procedure of pressing the magnet 6 by means of the fixing member 7 is now described, again with reference to FIGS. 2, 3, 4A and 4B.

The magnet 6 is inserted into the internal space 14 substantially along the rotation axis 8 and abuts with the abutting part 9 of the rotating member 2. Next, the fixing member 7 is inserted into the internal space 14 from the same direction as the direction in which the magnet 6 is inserted. The fixing member 7 is inserted into the internal space 14 such that the supporting part side acting part 7A of the fixing member 7 avoids the circumferential convex part 13 of the rotating member 2. After the magnet side acting part 7B of the fixing member 7 abuts with the magnet 6, the fixing member 7 rotates in a direction indicated by the arrow R. This rotation occurs when the force in one direction is added to knobs 7C located on the opposite surface of the magnet side acting part 7B. Since the supporting part 10 partially configures an inclined supporting part 10A having an inclination, the supporting part side acting part 7A of the fixing member 7 approaches the magnet and consequently the fixing member 7 deflects as the supporting part side acting part 7A slides along the inclined supporting part 10A while rotating in the direction of the arrow R. The fixing member 7 deflects while being supported by the supporting part side acting part 7A and the magnet side acting part 7B, whereby the force of the deflected fixing member 7 that tries to return to the original state thereof acts on the magnet 6 as the biasing force. The fixing member 7 is formed from a resin material and generates the biasing force by rotating the fixing member 7.

A mechanism for maintaining the biasing force of the fixing member 7 pressing the magnet 6 against the abutting part 9 of the rotating member 2 is described, again with reference to FIGS. 2, 3, 4A and 4B.

The fixing member 7 increases its biasing force on the magnet 6 as the supporting part side acting part 7A slides in the direction of the arrow R along the inclined supporting part 10A, as indicated by P1 in FIG. 4. In a state P3 in which a sufficient biasing force is obtained, the fixing member 7 stops rotating. Subsequently, even when the fixing member 7 tries to rotate in a direction opposite to the direction of the R by means of external shock or vibration, a rotation preventing part 11 provided on the supporting part 10 comes into contact with steps 7D provided in the vicinity of the supporting part side acting part 7A of the fixing member 7. As a result, the fixing member 7 is prevented from inversely rotating to the position of P2. In other words, the rotation preventing part 11 provided on the supporting part 10 of the rotating member 2 can prevent a situation where the fixing member 7 rotates inversely and becomes loose after fixing the magnet 6.

Note that the direction of rotation of the fixing member 7 indicated by the arrow R matches the direction in which the accelerator pedal 2 functioning as the rotating member 2 is returned to the rest position by a return spring. When the driver releases his/her foot from the accelerator pedal 2, the accelerator pedal 2 returns to the rest position rapidly, whereby the side opposite to the stepped part with the rotation axis 8 therebetween collides with the housing 1. The shock applied to the accelerator pedal 2 at this moment causes the area surrounding the internal space 14 and the fixing member 7 to slightly rotate relative to each other. Because the direction of this relative rotation matches the direction indicated by the arrow R, the supporting part side acting part 7A of the fixing member 7 can be prevented from running on the rotation preventing part 11 due to the shock, and the fixing member 7 can be prevented from loosening. In other words, the rotation preventing part 11 can prevent the fixing member 7 from rotating only in the direction which is opposite to the direction of the arrow R and in which the accelerator pedal is stepped on.

Figure 5:
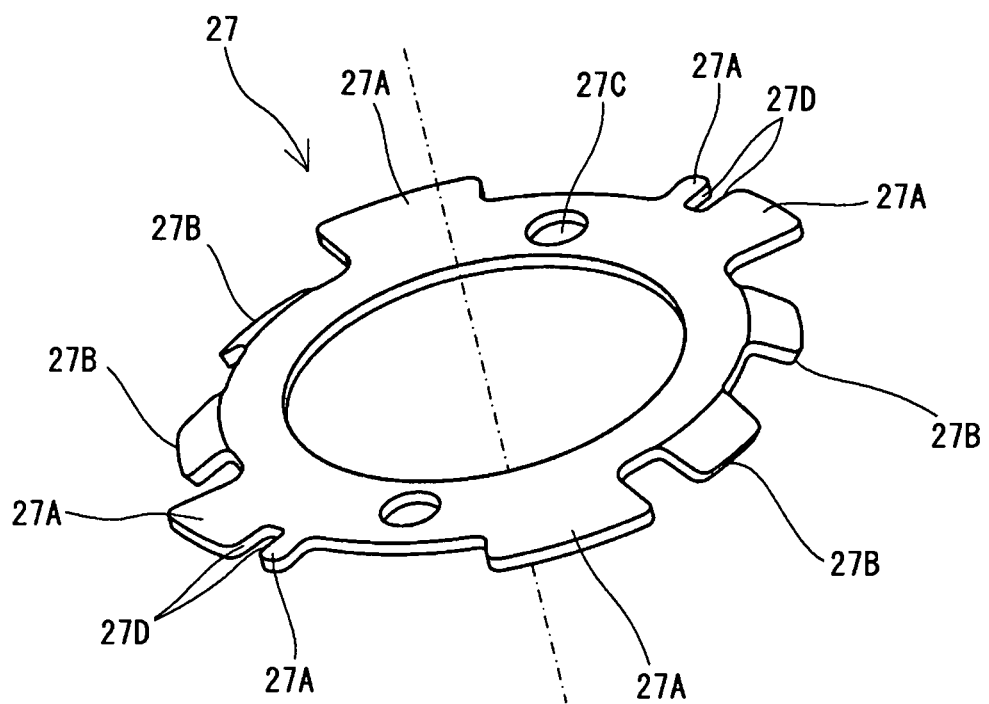
FIG. 5 is a structure diagram of a fixing member of a rotation angle detecting apparatus according to a second embodiment.

A configuration of the rotating member of the rotation angle detecting apparatus according to a second embodiment of the present invention is described with reference to FIG. 5. The contents that overlap with the descriptions of the fixing member of the first embodiment are omitted.

A fixing member 27 is formed from a toughness material, such as stainless steel and other metals. A magnet side acting part 27B and supporting part side acting part 27A are each disposed in four sections, two of the magnet side acting parts 27B being sandwiched between the supporting part side acting parts 27A in a circumferential direction. The fixing member 27 is rotated by the force added in one direction to holes 27C into which knobs are inserted, and the supporting part side acting parts 27A coming into contact with the supporting part 10 slide along the inclined supporting part 10A. Accordingly, the section including the magnet side acting parts 27B of the fixing member 27 is elastically deformed. In other words, the biasing force for pressing the magnet 6 against the abutting part 9 is generated as the fixing member 27 deflects between each of the parts 27A contacting the supporting part 10 and each of the parts 27B contacting the magnet 6. The fixing member 27 stops rotating when a sufficient biasing force is achieved by the elastic deformation of the magnet side acting parts 27B. Subsequently, even when the fixing member 7 is shocked or vibrated externally in such a way as to loosen in the opposite direction, the rotation preventing part 11 provided on the supporting part 10 and steps 27D of the fixing member 27 come into contact with each other, preventing the fixing member 27 from loosening.

As described above, the fixing member that is capable of biasing the magnet only by rotating between the magnet and the supporting part is employed, and the rotation preventing part for preventing the fixing member from loosening as a result of its inverse rotation. Thus, the magnet can be fixed steadily and variation of the detected angles of the magnet can be suppressed.

The above two embodiments have described an example in which the rotation angle detecting apparatus is applied to the accelerator pedal device, but the rotation angle detecting apparatus of the present invention can be applied to, for example, a throttle device. In this case, a throttle shaft that functions as a rotation axis of a throttle valve corresponds to the rotating member, and the magnet and the fixing member are disposed around the axis of the throttle shaft. The rotation angle detecting apparatus of the present invention can also be applied to an accelerator grip device of a two-wheel vehicle. In this case, the magnet and the fixing member are disposed around a rotation axis with respect to a rotating member coordinating with the rotation of an accelerator grip. Moreover, the rotation angle detecting apparatus of the present invention can be applied when fixing the magnet of a motor to the housing. In this case, the fixing member is inserted and rotated substantially coaxially after disposing the magnet coaxially with an output shaft of the motor, whereby the magnet can be fixed. In addition, the present invention can be applied in various other rotation angle detecting apparatuses for detecting a rotation angle using magnetic means.

The rotation angle detecting apparatus can be effectively applied particularly to a rotation angle detecting apparatus of an accelerator pedal or an accelerator grip of a two-wheel vehicle that controls the amount of intake air into an engine based on a depression angle, or to a throttle valve rotation angle detecting apparatus for controlling the amount of intake air into an engine.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A rotation angle detecting apparatus to detect a rotation angle of a rotating member, the rotation angle detecting apparatus comprising:
    a housing, the rotating member being disposed so as to be rotatable relative to the housing;
    a fixing member to fix a magnet to the rotating member; and
    a sensor, fixed to the housing, to detect a rotation angle of the magnet,
    the rotating member including an abutting part with which the magnet abuts in a direction of a rotation axis of the rotating member, and a supporting part that faces the abutting part with the magnet interposed therebetween to support the fixing member located between the magnet and the supporting part,
    the fixing member pressing the magnet against the abutting part by coming into contact with the supporting part and the magnet without allowing a section contacting the supporting part and a section contacting the magnet to overlap with each other in the direction of the rotation axis, and
    the fixing member pressing the magnet against the abutting part by being rotated in one direction around an axis that is parallel to the rotation axis in a space sandwiched between a plain surface including the abutting part and a plain surface including the supporting part.

2. The rotation angle detecting apparatus according to claim 1, wherein the supporting part includes an inclined supporting part which is a part of the supporting part inclined to the rest thereof, and
    a force to press the magnet against the abutting part increases as the fixing member rotates in the one direction along the inclined supporting part.

3. The rotation angle detecting apparatus according to claim 1, wherein the rotating member has a rotation preventing part that prevents the fixing member from rotating only in a direction opposite to the one direction.

4. The rotation angle detecting apparatus according to claim 2, wherein the rotating member has a rotation preventing part that prevents the fixing member from rotating only in a direction opposite to the one direction.

5. The rotation angle detecting apparatus according to claim 3, wherein the rotation preventing part is provided on the supporting part.

6. The rotation angle detecting apparatus according to claim 4, wherein the rotation preventing part is provided on the supporting part.

7. The rotation angle detecting apparatus according to claim 3, wherein the rotating member is configured by a member including an accelerator pedal that controls an amount of intake air into an engine based on a depression angle, and the rotation preventing part prevents the fixing member from rotating only in a direction in which the accelerator pedal is stepped on.

8. The rotation angle detecting apparatus according to claim 4, wherein the rotating member is configured by a member including an accelerator pedal that controls an amount of intake air into an engine based on a depression angle, and the rotation preventing part prevents the fixing member from rotating only in a direction in which the accelerator pedal is stepped on.

9. The rotation angle detecting apparatus according to claim 5, wherein the rotating member is configured by a member including an accelerator pedal that controls an amount of intake air into an engine based on a depression angle, and the rotation preventing part prevents the fixing member from rotating only in a direction in which the accelerator pedal is stepped on.

10. The rotation angle detecting apparatus according to claim 6, wherein the rotating member is configured by a member including an accelerator pedal that controls an amount of intake air into an engine based on a depression angle, and the rotation preventing part prevents the fixing member from rotating only in a direction in which the accelerator pedal is stepped on.

* * * * *